US010845495B2

(12) United States Patent
Feng et al.

(10) Patent No.: US 10,845,495 B2
(45) Date of Patent: Nov. 24, 2020

(54) METHOD AND DEVICE OF IDENTIFYING FRACTURE

(71) Applicant: PetroChina Company Limited, Beijing (CN)

(72) Inventors: Chao Feng, Beijing (CN); Tuanyu Teng, Beijing (CN); Qingzhou Yao, Beijing (CN); Delong Ma, Beijing (CN); Han Zhang, Beijing (CN); Lu Yin, Beijing (CN); Linjun Huang, Beijing (CN)

(73) Assignee: PETROCHINA COMPANY LIMITED, Beijing (CN)

( * ) Notice: Subject to any disclaimer, the term of this patent is extended or adjusted under 35 U.S.C. 154(b) by 405 days.

(21) Appl. No.: 15/878,254

(22) Filed: Jan. 23, 2018

(65) Prior Publication Data

US 2019/0041535 A1 Feb. 7, 2019

(30) Foreign Application Priority Data

Aug. 7, 2017 (CN) .......................... 2017 1 0665197

(51) Int. Cl.
*G01V 1/50* (2006.01)
*E21B 47/005* (2012.01)

(52) U.S. Cl.
CPC .............. *G01V 1/50* (2013.01); *E21B 47/005* (2020.05); *G01V 2210/642* (2013.01); *G01V 2210/646* (2013.01)

(58) Field of Classification Search
CPC . G01V 1/50; G01V 2210/646; E21B 47/0005
See application file for complete search history.

(56) References Cited

U.S. PATENT DOCUMENTS 10,386,515 B2 * 8/2019 Downton ............... G01V 1/306
2009/0252418 A1 10/2009 Bouma
2017/0023687 A1 * 1/2017 Sicking .................. G01V 1/302

FOREIGN PATENT DOCUMENTS

CN 103364835 A 10/2013
CN 103455985 A 12/2013

(Continued)

OTHER PUBLICATIONS

Li, Wenpeng, et al., “Three-dimensional seismic data analysis based on structural tensor,” Software Guide, vol. 15, No. 02, pp. 151-153 (2016).

(Continued)

*Primary Examiner* — Ian J Lobo
(74) *Attorney, Agent, or Firm* — Hamilton, Brook, Smith & Reynolds, P.C.

(57) ABSTRACT

A method and device of identifying a fracture are provided in the embodiments of the present application. The method comprises: determining three components of structure quantification for each data point in a seismic data volume; constructing a structure quantification matrix of the data point according to the three components of structure quantification for each of the data points; determining feature value and feature vector of the structure quantification matrix of each of the data points; determining fracture attribute value of the data point according to the feature value and feature vector of the structure quantification matrix of each of the data points; constructing a data volume of the fracture attribute according to the fracture attribute values of respective data points; and performing a fracture extraction for the data volume of the fracture attribute according to the feature vectors of the structure quantification matrix of the respective data points. The embodiments of the present application can improve the accuracy of identifying a minor fracture, so as to realize an effective identification of the minor fracture.

17 Claims, 6 Drawing Sheets determining three components of structure quantification for each data point in a seismic data volume — S101 constructing a structure quantification matrix of the data point according to the three components of structure quantification for each of the data points — S102 determining feature value and feature vector of the structure quantification matrix of each of the data points — S103 determining fracture attribute value of the data point according to the feature value and feature vector of the structure quantification matrix of each of the data points — S104 constructing a data volume of the fracture attribute according to the fracture attribute values of respective data points — S105 performing a fracture extraction for the data volume of the fracture attribute according to the feature vectors of the structure quantification matrix of the respective data points — S106

(56) References Cited

FOREIGN PATENT DOCUMENTS

| | | | |
|---|---|---|---|
| CN | 103489163 | A | 1/2014 |
| CN | 103675902 | A | 3/2014 |
| CN | 103792576 | A | 5/2014 |
| CN | 104020492 | A | 9/2014 |
| CN | 104181598 | A | 12/2014 |
| CN | 104316963 | A | 1/2015 |
| CN | 106355600 | A | 1/2017 |

OTHER PUBLICATIONS

Yang, Peijie et al., "Orientational edge preserving fault enhance," Chinese Journal of Geophysics, vol. 53, No. 12, pp. 2992-2997 (Dec. 2010).

Yongzhuang, Sun., "The Research of Abnormal Geological Body Identification Based on Seismic Edge Detection," pp. 41-42 (2012).

Search report dated Oct. 25, 2018 for counterpart Chinese Patent Application No. 2017106651974, along with machine translation downloaded from EPO.

"Goaf Identification Method Based on Seismic Data Gradient Structure Tensor (GST) Attributes," Coal Geology of China, vol. 25, No. 7, pp. 42-47 (Jul. 2013).

* cited by examiner

METHOD AND DEVICE OF IDENTIFYING FRACTURE

RELATED APPLICATION

This application Chinese Patent Application No. 201710665197.4, filed on Aug. 7, 2017, with the title "METHOD AND DEVICE OF IDENTIFYING FRACTURE", which is hereby incorporated by reference in its entirety.

TECHNICAL FIELD

The present application relates to the technical field of reservoir exploration and development, more particularly, to a method and device of identifying a fracture.

BACKGROUND OF THE INVENTION

Fracture is an important factor for controlling hydrocarbon accumulation, and therefore fracture identification is significant for finding out a fault-related hydrocarbon reservoir. At present, coherence algorithms are generally adopted for identifying a fracture, which detect a fracture using correlation or similarity between two seismic traces.

As the continuous deep-going for reservoir exploration and development, the method of identifying a fracture is also continuously developed and updated, and up to now, coherence algorithms for identifying a fracture have developed to the third generation from the first generation. However, as a minor fracture is presented in seismic data such that no dislocation is found in lineups, breakpoints are obscure and multi-solution is strong. Therefore, the current coherence algorithms are less able to identify such a minor fracture, and cannot effectively identify the minor fracture.

SUMMARY OF THE INVENTION

An objective of the embodiments of the present application is to provide a method and device of identifying a fracture, so as to improve the accuracy of identifying a minor fracture.

In order to achieve the above-mentioned objective, on the one hand, the embodiments of the present application provide a method of identifying a fracture, comprising steps of:

determining three components of structure quantification for each data point in a seismic data volume;

constructing a structure quantification matrix of the data point according to the three components of structure quantification for each of the data points;

determining feature value and feature vector of the structure quantification matrix of each of the data points;

determining fracture attribute value of the data point according to the feature value and feature vector of the structure quantification matrix of each of the data points;

constructing a data volume of the fracture attribute according to the fracture attribute values of respective data points; and performing a fracture extraction for the data volume of the fracture attribute according to the feature vectors of the structure quantification matrix of the respective data points.

The method of identifying a fracture in the embodiments of the present application, the step of determining three components of structure quantification for each data point in the seismic data volume comprising:

convoluting each of the data points in the seismic data volume and a first order derivative of Gaussian function to obtain three components of structure quantification for the data point.

The method of identifying a fracture in the embodiments of the present application, convoluting each of the data points in the seismic data volume and the first order derivative of Gaussian function according to the following equations:

$$d(x)=E(u(x,y,z)\otimes G(x,\sigma)');$$

$$d(y)=E(u(x,y,z)\otimes G(y,\sigma)');$$

$$d(z)=E(u(x,y,z)\otimes G(z,\sigma)');$$

where d(x), d(y) and d(z) are the three components of structure quantification for the data points, respectively; u(x,y,z) is a data amplitude of the data points; E( ) is a weighted range control function; G(x,σ)', G(y,σ)' and G(z, σ)' are the first order derivatives of the Gaussian function in x, y and z directions, respectively.

The method of identifying a fracture in the embodiments of the present application, the weighted range control function comprises:

$$\sigma = \alpha \times \frac{1}{f}$$

where σ is a weighted scope control coefficient; α is a constant coefficient; and f is a primary frequency of the data points.

The method of identifying a fracture in the embodiments of the present application, constructing the structure quantification matrix of each of the data points according to the following equation:

$$A = \begin{bmatrix} \overline{d(x)\times d(x)} & \overline{d(x)\times d(y)} & \overline{d(x)\times d(z)} \\ \overline{d(y)\times d(x)} & \overline{d(y)\times d(y)} & \overline{d(y)\times d(z)} \\ \overline{d(z)\times d(x)} & \overline{d(z)\times d(y)} & \overline{d(z)\times d(z)} \end{bmatrix}$$

where d(x), d(y) and d(z) are the three components of structure quantification for the data points, respectively; A is the structure quantification matrix of the data points; and each element in the A is a weighted mean of the three components of structure quantification for the data points.

The method of identifying a fracture in the embodiments of the present application, determining fracture attribute value of each of the data points according to the following equation:

$$c = \left(1 - \frac{\lambda_1 - \lambda_2}{\lambda_1 + \lambda_2}\right) \times \left(\frac{\lambda_2 - \lambda_3}{\lambda_2 + \lambda_3}\right) \times \left(\left(\frac{\partial \vec{l}_1}{\partial x}\right)^2 + \left(\frac{\partial \vec{l}_1}{\partial y}\right)^2 + \left(\frac{\partial \vec{l}_1}{\partial z}\right)^2\right)$$

where C is a fracture attribute value of the data point, $\lambda_1$, $\lambda_2$ and $\lambda_3$ are three feature vectors of the data points, $\vec{l}_1$ is a feature vector corresponding to the maximum feature value.

The method of identifying a fracture in the embodiments of the present application, the fracture attribute values range from 0 to 1 in the data volume of the fracture attribute, in the stratum corresponding to the seismic data volume, a attribute value of the fracture attribute value is 0 in a level site and a attribute value of the fracture attribute value is 1 in a distorted or bad break.

The method of identifying a fracture in the embodiments of the present application, the step of performing the fracture extraction for the data volume of the fracture attribute according to the feature vectors of the structure quantification matrix of the respective data points comprising:

determining feature vector corresponding to the maximum feature value of the structure quantification matrix for each of the data points; and extracting the maximum fracture attribute value along the feature vector direction from the data volume of the fracture attribute, and assigning 0 to the fracture attribute value of the non-maximum value part in the feature vector direction in the data volume of the fracture attribute.

On the other hand, the embodiments of the present application additionally provide a device of identifying a fracture, comprising:

structure quantification module configured to determine three components of structure quantification for each data point in a seismic data volume;

matrix construction module configured to construct a structure quantification matrix of the data point according to the three components of structure quantification for each of the data points;

matrix solution module configured to determine feature value and feature vector of the structure quantification matrix of each of the data points;

attribute determination module configured to determine fracture attribute value of the data point according to the feature value and feature vector of the structure quantification matrix of each of the data points;

attribute data volume construction module configured to construct a data volume of the fracture attribute according to the fracture attribute values of respective data points; and fracture extraction module configured to perform a fracture extraction for the data volume of the fracture attribute according to the feature vectors of the structure quantification matrix of the respective data points.

The device of identifying a fracture in the embodiments of the present application, the structure quantification module is further configured to convolute each of the data points in the seismic data volume and a first order derivative of Gaussian function to obtain three components of structure quantification for the data point.

The device of identifying a fracture in the embodiments of the present application, convoluting each of the data points in the seismic data volume and the first order derivative of Gaussian function according to the following equations:

$$d(x)=E(u(x,y,z)\otimes G(x,\sigma)');$$

$$d(y)=E(u(x,y,z)\otimes G(y,\sigma)');$$

$$d(z)=E(u(x,y,z)\otimes G(z,\sigma)');$$

where d(x), d(y) and d(z) are the three components of structure quantification for the data points, respectively; u(x,y,z) is a data amplitude of the data points; E( ) is a weighted range control function; G(x,σ)', G(y,σ)' and G(z, σ)' are the first order derivatives of the Gaussian function in x, y and z directions, respectively.

The device of identifying a fracture in the embodiments of the present application, the weighted range control function comprises:

$$\sigma = \alpha \times \frac{1}{f}$$

where σ is a weighted scope control coefficient; α is a constant coefficient; and f is a primary frequency of the data points.

The device of identifying a fracture in the embodiments of the present application, constructing the structure quantification matrix of each of the data points according to the following equation:

$$A = \begin{bmatrix} \overline{d(x)\times d(x)} & \overline{d(x)\times d(y)} & \overline{d(x)\times d(z)} \\ \overline{d(y)\times d(x)} & \overline{d(y)\times d(y)} & \overline{d(y)\times d(z)} \\ \overline{d(z)\times d(x)} & \overline{d(z)\times d(y)} & \overline{d(z)\times d(z)} \end{bmatrix}$$

where d(x), d(y) and d(z) are the three components of structure quantification for the data points, respectively; A is the structure quantification matrix of the data points; and each element in the A is a weighted mean of the structure quantification three-components of the data points.

The device of identifying a fracture in the embodiments of the present application, determining fracture attribute value of each of the data points according to the following equation:

$$c = \left(1-\frac{\lambda_1-\lambda_2}{\lambda_1+\lambda_2}\right)\times\left(\frac{\lambda_2-\lambda_3}{\lambda_2+\lambda_3}\right)\times\left(\left(\frac{\partial \vec{l}_1}{\partial x}\right)^2+\left(\frac{\partial \vec{l}_1}{\partial y}\right)^2+\left(\frac{\partial \vec{l}_1}{\partial z}\right)^2\right)$$

where C is a fracture attribute value of the data points, $\lambda_1$, $\lambda_2$ and $\lambda_3$ are three feature vectors of the data points, and $\vec{l}_1$ is a feature vector corresponding to the maximum feature value.

The device of identifying a fracture in the embodiments of the present application, the fracture attribute values range from 0 to 1 in the data volume of the fracture attribute, in the stratum corresponding to the seismic data volume, a attribute value of the fracture attribute value is 0 in a level site and a attribute value of the fracture attribute value is 1 in a distorted or bad break.

The device of identifying a fracture in the embodiments of the present application, the fracture extraction module is further configured to:

determine feature vector corresponding to the maximum feature value of the structure quantification matrix for each of the data points; and extract the maximum fracture attribute value along the feature vector direction from the data volume of the fracture attribute, and assigning 0 to the fracture attribute value of the non-maximum value part in the feature vector direction in the data volume of the fracture attribute.

On still another aspect, the embodiments of the present application additionally provide another device of identifying a fracture, comprising: a memory, a processor and a computer program stored on the memory, the computer program performs the following steps when being operated by the processor:

determining three components of structure quantification for each data point in a seismic data volume;

constructing a structure quantification matrix of the data point according to the three components of structure quantification for each of the data points;

determining feature value and feature vector of the structure quantification matrix of each of the data points;

determining fracture attribute value of the data point according to the feature value and feature vector of the structure quantification matrix of each of the data points;

constructing a data volume of the fracture attribute according to the fracture attribute values of respective data points; and performing a fracture extraction for the data volume of the fracture attribute according to the feature vectors of the structure quantification matrix of the respective data points.

It can be seen from the technical solutions provided in the embodiments of the present application that the embodiments of the present application first construct a structure quantification matrix of the data points and solves feature values and feature vectors thereof according to the three components of structure quantification for the data points; next, determine fracture attribute values of the data points according to the feature values and feature vectors of the structure quantification matrix of the data points; then construct a data volume of the fracture attribute according to the fracture attribute values of the data points; and finally, perform a fracture extraction for the data volume of the fracture attribute according to the feature vectors of the structure quantification matrix of the data points, so as to identify a minor fracture by way of quantitative analysis of leveling and continuity of structure of seismic data. The embodiments of the present application are relatively sensitive to detections of changes in minor fractures slightly dislocated for lineups, and have an obvious response to tiny bending changes in lineups; therefore it can improve the accuracy of identifying a minor fracture, so as to realize an effective identification of the minor fracture.

BRIEF DESCRIPTION OF THE DRAWINGS

In order to illustrate the embodiments of the present application or technical solutions in the prior art more clearly, the accompanying drawings desired to be used in the description of the embodiments or the prior art will be briefly described below; apparently, the accompanying drawings in the following description are only some embodiments recited in the application, those skilled in the art can also obtain other accompanying drawings according to these ones without the exercise of inventive faculty.

DETAILED DESCRIPTION OF THE INVENTION

The technical solutions in the embodiments of the present application are clearly and completely described below in conjunction with the accompanying drawings in the embodiments of the present application, so that those skilled in the art will more readily understand the technical solutions of the present application. It is obvious that the described embodiments are only a portion of the embodiments of the present application, rather than all the embodiments. Based on the embodiments in the application, all the other embodiments obtained by those skilled in the art without adding inventive efforts should fall within the protection scope of the present application.

Conventional coherence methods detect a fracture according to the correlation or similarity between seismic traces, however, features of minor fractures differ slightly in the correlation and similarity between the seismic traces, and thus coherence algorithms suffer from serious disadvantages in the method of identifying a minor fracture.

Figures 2A, 2B:
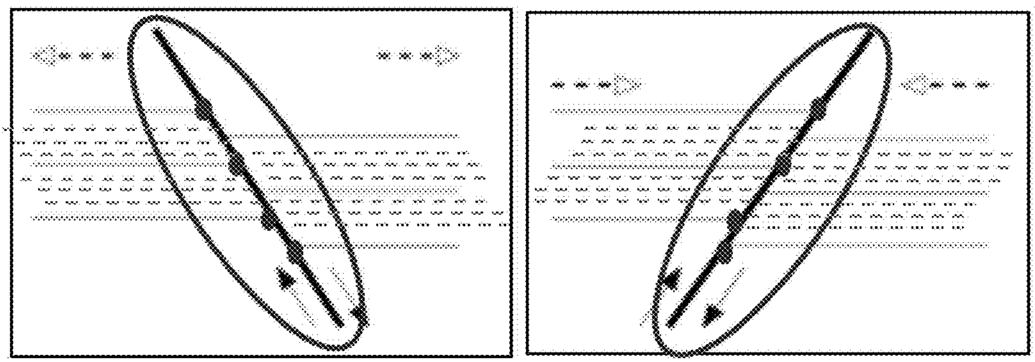
FIG. 2*a* is a schematic diagram illustrating a normal fault in one embodiment of the present application.
FIG. 2*b* is a schematic diagram illustrating a reverse fault in one embodiment of the present application.

In the process in which the present application is implemented, the inventor of the present application' study found that when there exists a fracture, the leveling and continuity of stratum corresponding to the seismic data can be corrupted, as shown in the elliptical parts of FIG. 2*a* and FIG. 2*b*. Therefore, the present application does not start from the perspective of describing the correlation or similarity of traces any more, but looks for places where the data are discontinuous and unleveled by quantitative analysis of seismic data structure in terms of leveling and continuity to achieve the objective for identifying a minor fracture. To be specific, it starts from the perspective of quantifying a spatial structure of seismic data, establishes a structural quantitative analysis matrix, and constructs fracture attribute values by the matrix feature values to quantify fracture structure features, so as to identify a minor fracture.

As any object has certain structural features, a level of difficulty in quantization characterization also varies from complexity of object structures. For example, a size of one cube can be quantified and characterized by volume or side length, one rectangular shape is characterized by long-width ratio, etc. A person can simply represent a height of a mountain range with an individual numerical value, but find it difficult to quantitatively characterize a shape of the mountain range. The same goes with seismic data, it is difficult to quantitatively characterize a detailed morphology of the seismic data clearly, so it is essential to simplify the problem, and it is possible to effectively identify a fracture as long as the leveling and continuity of the seismic data are quantitatively characterized.

Figure 3:
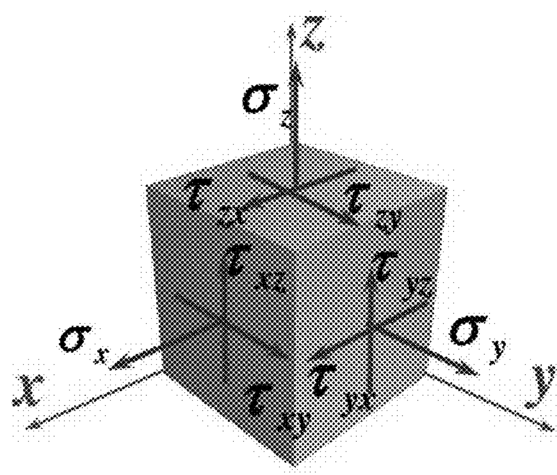
FIG. 3 is a stress schematic diagram illustrating one point of elastic media in one embodiment of the present application.

The data structure quantitative analysis principle of the present application is similar to stress analysis. Stress can characterize the strained condition of one point in elastic media, wherein it comprises: normal stress and shear stress, and as shown in FIG. 3, primary stress and lateral stress can be calculated by stress matrix, and the strained condition of such point can be quantitatively characterized by using its feature values. Likewise, by calculating structure change components of one point in seismic data along three directions of coordinate system axes, constructing a three-dimensional data structure quantization matrix based on the three components, solving the matrix and obtaining feature values, then creating fracture attribute values according to the feature values.

Figure 1:
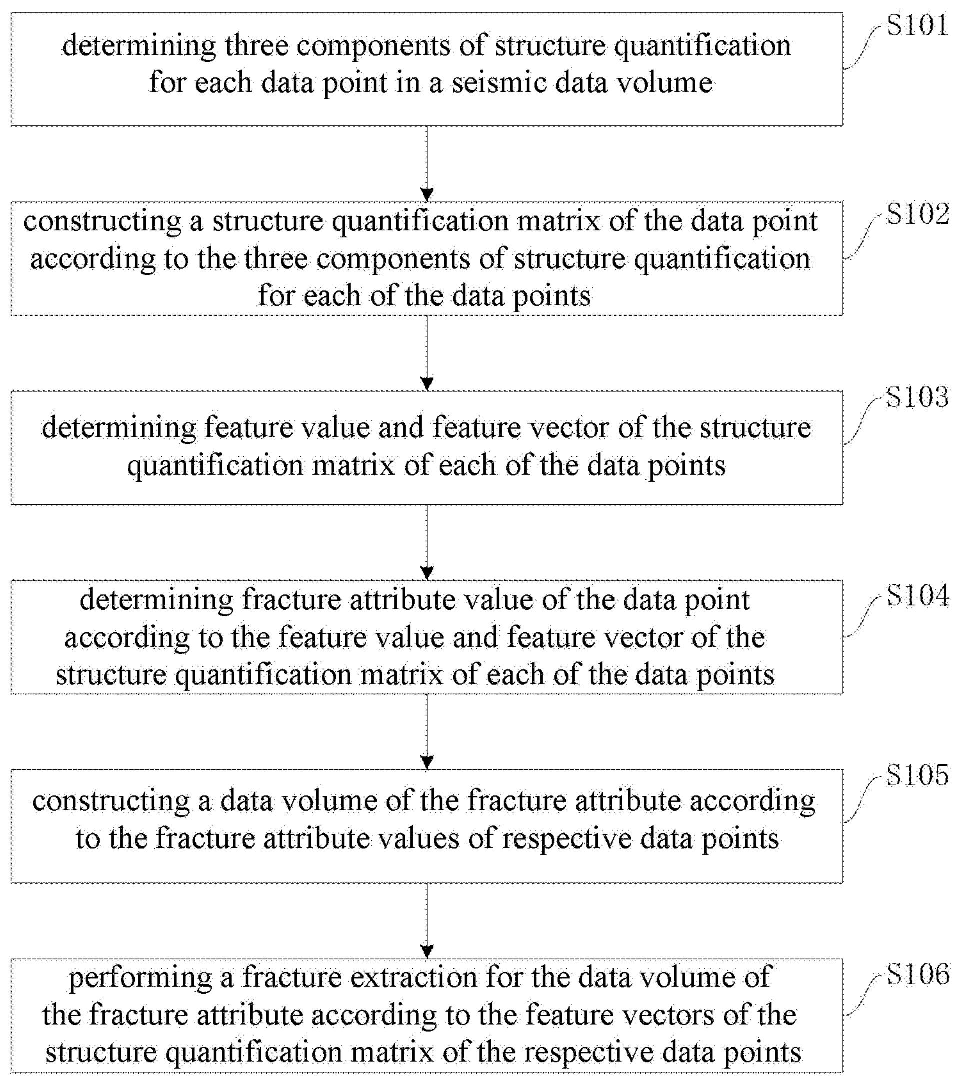
FIG. 1 is a flow diagram illustrating a method of identifying a fracture in one embodiment of the present application.

For ease of understanding the present application, it is specifically described below:

As shown in FIG. 1, the method of identifying a fracture in one embodiment of the present application can comprise steps of:

S101, determining three components of structure quantification for each data point in a seismic data volume.

In one embodiment of the present application, the seismic data volume can be a three-dimensional meshing seismic data volume. Therefore, the seismic data volume can be a large cube made up of multiple small cubes, wherein the junction point between the each small cube in the large cube and other cubes connected thereto can be considered as one data point.

In one embodiment of the present application, by way of convoluting each of the data points in the seismic data volume and a first order derivative of Gaussian function, obtaining three components of structure quantification for the data points, accordingly. For example, in one embodiment of the present application, convoluting each of the data points in the seismic data volume and the first order derivative of Gaussian function according to the following equations:

$$d(x)=E(u(x,y,z)\otimes G(x,\sigma)');$$

$$d(y)=E(u(x,y,z)\otimes G(y,\sigma)');$$

$$d(z)=E(u(x,y,z)\otimes G(z,\sigma)');$$

where d(x), d(y) and d(z) are the three components of structure quantification for the data points, respectively; u(x,y,z) is a data amplitude of the data points; E( ) is a weighted range control function; ⊗ represents convolution symbols; G(x,σ)', G(y,σ)' and G(z, σ)' are the first order derivatives of the Gaussian function in x, y and z directions, respectively. For example, G(x; σ) represents a Gaussian function, the formula of which is:

$$G(x;\sigma)=\frac{1}{\sqrt{2\pi}\,\sigma}e^{-\frac{x^2}{2\sigma^2}},$$

then the first order derivative of G(x; σ)' is $$G(x;\sigma)=\frac{\partial G(x;\sigma)}{\partial x}.$$

In the embodiments of the present application, the weighted range control function E( ) is used to define a selection range for elements in an adaptive structure quantization matrix. The reason that a certain range is chosen is because a structure quantification analysis matrix is constructed using only one data point, if any noise disturbance is found for the point, traces of noise would obviously appear in the attribute volume of the feature value, but such response falls out of the feature of a minor fracture. In the case where such point and points within its neighboring certain range are subjected to three-dimensional Gaussian weighting and smoothing, it is possible to effectively reduce the noise and make the quantitative analysis method more robust.

The selection of range is also extremely important: if an excessively large range is taken, it can result in an excessively low resolution of the final result and a decrease in response intensity of a minor fracture; while if an excessively small range is taken, a more severe stratum response interference is found. By studying for a long period of time, inventors herein have found that: by calculating a primary frequency for the seismic data of each data point, and calculating three-dimensional Gaussian weighting smoothing coefficient according to the primary frequency, it is possible to realize that the range size of elements is adaptively regulated and controlled by the coefficient, so as to effectively avoid tedious manual testing of data and effectively reduce stratum response interference while the resolution is not decreased. The three-dimensional Gaussian weighted formula therein can be illustrated as follows:

$$G(x,y,z;\sigma)=\frac{1}{2\sqrt{2\pi}\,\sigma^3}e^{-\frac{x^2+y^2+z^2}{2\sigma^2}}$$

where σ is a weighted scope control coefficient (i.e. a weighted scope control function), which decides an extraction range of the elements. The parameter can be calculated by the following equation in the embodiments of the present application:

$$\sigma=\alpha\times\frac{1}{f}$$

wherein α is a constant value coefficient for correcting a range size; and f is a primary frequency of data point. It can be seen that when the seismic frequency is high, the weighted scope control coefficient gets smaller, and thus the extraction range of the elements is decreased, the number of samples participated in constructing a matrix in 3-D data volume is decreased correspondingly, which can improve the structure quantization resolution.

S102, constructing a structure quantification matrix of the data point according to the three components of structure quantification for each of the data points.

In one embodiment of the present application, the structure quantification matrix of each data point can be constructed according to the following equation;

$$A=\begin{bmatrix}\overline{d(x)\times d(x)} & \overline{d(x)\times d(y)} & \overline{d(x)\times d(z)}\\ \overline{d(y)\times d(x)} & \overline{d(y)\times d(y)} & \overline{d(y)\times d(z)}\\ \overline{d(z)\times d(x)} & \overline{d(z)\times d(y)} & \overline{d(z)\times d(z)}\end{bmatrix}$$

where d(x), d(y) and d(z) are the three components of structure quantification for the data points, respectively; A is the structure quantification matrix of the data points; and each element in the A is a weighted mean of the three components of structure quantification for the data points, e.g., the element $\overline{d(x)\times d(y)}$ in A represents the weighted mean of d(x) and d (Y) in the three components of structure quantification for the data points.

S103, determining the feature value and feature vector of the structure quantification matrix of each of the data points.

In one embodiment of the present application, after the structure quantification matrix of the data points is established, by solving the structure quantification matrix, the corresponding feature values and feature vectors can be obtained. In one exemplary embodiment of the present application, for example, the matrix can be solved by using Jacobi diagonalizable elimination method.

S104, determining fracture attribute value of the data point according to the feature value and feature vector of the structure quantification matrix of each of the data points.

Different data points can correspond to different strata configurations, and accordingly, the feature values of the structure quantification matrix of different data points then embody the strata configurations of the corresponding data points.

In order to facilitate understanding of the present application, two-dimensional seismic data is first explained below as an example:

In one exemplary embodiment, the structure quantification matrix of one data point in two-dimensional seismic data is shown as follows:

$$A=\begin{bmatrix}E(u(x,y)\otimes G(x,\sigma)')\times & E(u(x,y)\otimes G(x,\sigma)')\times\\ E(u(x,y)\otimes G(x,\sigma)') & E(u(x,y)\otimes G(y,\sigma)')\\ E(u(x,y)\otimes G(y,\sigma)')\times & E(u(x,y)\otimes G(y,\sigma)')\times\\ E(u(x,y)\otimes G(x,\sigma)') & E(u(x,y)\otimes G(y,\sigma)')\end{bmatrix}$$

where A represents the structure quantification matrix, u(x,y) represents the magnitude of data, and ⊗ represents the convolution symbols.

By solving the matrix, feature values $\lambda_1$, $\lambda_2$ ($\lambda_1>\lambda_2>0$) can be solved. Table 1 shows the relationship between the data points and two feature values, which is specifically divided into the following four cases.

Figures 4A, 4B, 4C, 4D:
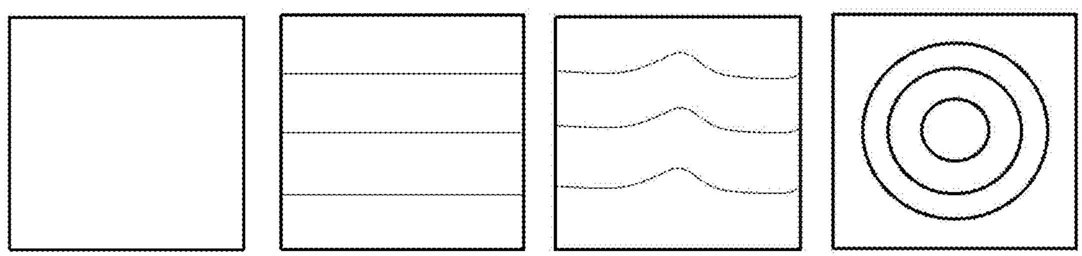
FIGS. 4*a* to 4*d* are schematic diagrams of fault structures in different cases in one embodiment of the present application.

Case 1: when both of the feature values are 0, it illustrates that the numerical values of data points and their surrounding points are exactly the same without change in the structure, e.g., when the whole two-dimensional data volume has a value of 1, the feature values are 0. As shown in FIG. 4*a.*

Case 2: the feature values are only $\lambda_1$, and the data are changed only in one direction, in this case, there exists a primary feature vector of structure without lateral feature vector. As shown in FIG. 4*b.*

Case 3: this case is a deformation occurred in the case of Case 2, in this case, there exists lateral feature vector in the middle positions, therefore there are two feature values being not zero, such slight bending is unlikely to allow lateral feature vector to be greater than the primary feature vector (where the primary feature vector and lateral feature vector are orthogonal), therefore $\lambda_1>\lambda_2$. As shown in FIG. 4*c.*

Case 4: when the lateral feature vector is not only orthogonal but also equal to the primary feature vector, in this case, such graphical structure becomes an isotropic structure. As shown in FIG. 4*d.*

In order to quantify a degree of bending of the diagram, the fracture attribute values of the data points can be determined by the following equation:

$$C=\left(1-\frac{\lambda_1-\lambda_2}{\lambda_1+\lambda_2+\varepsilon}\right)\times\left(\left(\frac{\partial\vec{l}_1}{\partial x}\right)^2+\left(\frac{\partial\vec{l}_1}{\partial y}\right)^2\right)$$

where C is the fracture attribute values of the data points, $\lambda_1$ and $\lambda_2$ are the feature vectors of the data points, $\vec{l}_1$ is the feature vector corresponding to the maximum feature value, ε is a constant, e.g., it can be a number less than 0.0001. When there is no strata configuration, the fracture attribute value is 1; and when it is a flat structure, there exists only one feature value, and the other is 0, and the fracture attribute value is close to 0; and when the stratum rises and falls from flatness, there are two non-equivalence feature values, the fracture attribute value lies between 0 to 1, and the more even the closer to 0, the more uneven the closer to 1.

TABLE 1

| Case | $\lambda_1$ | $\lambda_2$ | Description |
|---|---|---|---|
| 1 | 0 | 0 | two feature values are 0, and the numerical value is fixed without measurable structure |
| 2 | >0 | 0 | one feature value is 0 with linear structure |
| 3 | >0 | $\lambda_1>\lambda_2>0$ | both of the feature values are greater than 0, in this case, there exists lateral feature vectors, it starts to deviate from the linear structure, and is presented as noise, bending deformation, and multi-directional changes occur. |
| 4 | >0 | $\lambda_1=\lambda_2>0$ | both of the feature values are greater than 0 and exactly the same; in this case, the structure is isotropous. |

Similarly, in one embodiment of the present application, for each data point in the 3-D data volume, the relationship between the data points and the two feature values can be shown in Table 2 below:

TABLE 2

| Case | $\lambda_1$ | $\lambda_2$ | $\lambda_3$ | Description |
|---|---|---|---|---|
| 1 | 0 | 0 | 0 | three feature values are 0, and the numerical value is fixed without measurable structure |

TABLE 2-continued

| Case | $\lambda_1$ | $\lambda_2$ | $\lambda_3$ | Description |
|---|---|---|---|---|
| 2 | >0 | 0 | 0 | one feature value is greater than 0 with planar layered structure |
| 3 | >0 | >0 | 0 | both of the feature values are greater than 0, in this case, there exists lateral feature vectors; it starts to deviate from the layered structure, and is presented such that flexure of bedding surface along some trend occurs. |
| 4 | >0 | >0 | $\lambda_1 > \lambda_2 > \lambda_3 > 0$ | three feature values are greater than 0 and are unequal, and are presented as stratum structures like hill and sub-sag. |
| 5 | >0 | >0 | $\lambda_1 = \lambda_2 = \lambda_3 > 0$ | three feature values are greater than 0, if they are equal, the structure is isotropic (extremely uncommon in actual documents). |

Accordingly, for each data point in the 3-D data volume, in order to quantify a degree of bending of the diagram, the fracture attribute values of the data points can be determined by the following equation:

$$c = \left(1 - \frac{\lambda_1 - \lambda_2}{\lambda_1 + \lambda_2}\right) \times \left(\frac{\lambda_2 - \lambda_3}{\lambda_2 + \lambda_3}\right) \times \left(\left(\frac{\partial \vec{l}_1}{\partial x}\right)^2 + \left(\frac{\partial \vec{l}_1}{\partial y}\right)^2 + \left(\frac{\partial \vec{l}_1}{\partial z}\right)^2\right)$$

where C is the fracture attribute value of the data points, $\lambda_1$, $\lambda_2$ and $\lambda_3$ are three feature vectors of the data points, and $\vec{l}_1$ is the feature vector corresponding to the maximum feature value.

When a dislocation or bending occurs in stratum lineups, leveling and continuity can decrease, in this case, the C value becomes closer to 1, and in the case of continuous leveling of stratum, the C value becomes closer to 0.

S105, constructing a data volume of the fracture attribute according to the fracture attribute values of respective data points.

After the fracture attribute values of the data points are determined, these fracture attribute values constitute one fracture attribute data volume. Each fracture attribute value in the fracture attribute data volume ranges from 0 to 1, and in the stratum corresponding to the seismic data volume, the attribute value of the fracture attribute value is 0 in flatness, and the attribute value of the fracture attribute values is 1 in a distorted or bad break.

S106, performing a fracture extraction for the data volume of the fracture attribute according to the feature vectors of the structure quantification matrix of the respective data points.

In one embodiment of the present application, the step of performing the fracture extraction for the data volume of the fracture attribute according to the feature vectors of the structure quantification matrix of the data points can comprises:

for each data point, determining feature vectors corresponding to the maximum feature value of its structure quantification matrix; extracting the maximum fracture attribute value along the feature vector direction from the data volume of the fracture attribute, and assigning 0 to the fracture attribute value of the non-maximum value part in the feature vector direction in the data volume of the fracture attribute, so as to complete fracture extraction. As the feature vector corresponding to the maximum feature value indicates the direction in which the fracture attribute value changes the most rapidly, therefore the fracture position can be more accurately calculated by using such fracture extraction manner in the embodiments of the present application.

Although the procedures described above include a plurality of operations appeared in a particular order, it should be clearly understood that these procedures can include more or less operations, and these operations can be performed sequentially or in parallel (e.g., using parallel processors or a multithreaded environment).

For ease of understanding of the present application, using the third generation coherence algorithms in the fracture identification method and business software of the embodiments of the present application, some of the data about work area of Mahu-West 1 and work area of Mahu tie-area in Junggar Basin are subjected to comparison processing, respectively.

Figure 5:
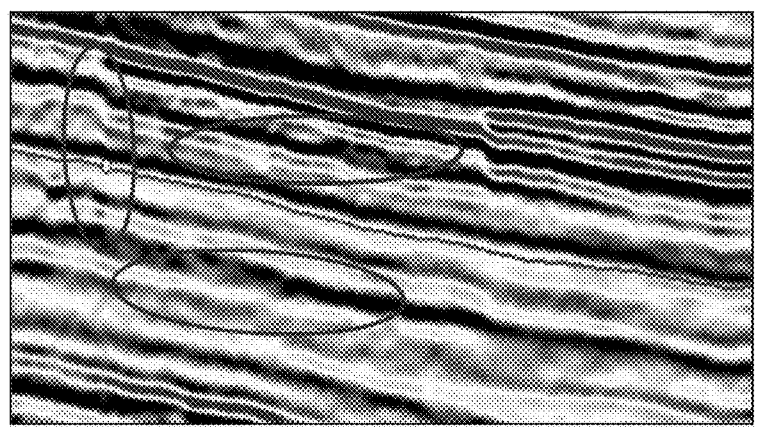
FIG. 5 illustrates some seismic profile positioned in work area of Mahu-West 1 in one embodiment of the present application.
Figure 6:
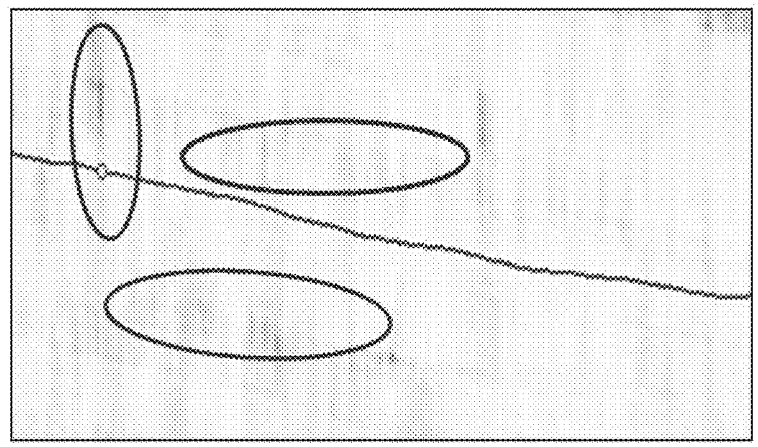
FIG. 6 illustrates the fracture detection profile obtained using the existing third generation coherence fracture identification method.
Figure 7:
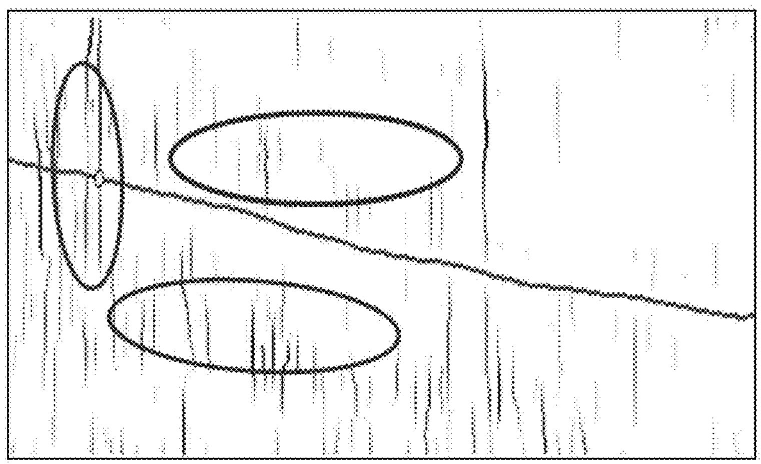
FIG. 7 illustrates the fracture detection profile obtained using the method of identifying a fracture in the embodiments of the present application.

FIG. 5 illustrates some original seismic profile positioned in work area of Mahu-West 1 in one embodiment of the present application. FIG. 6 illustrates the fracture detection profile obtained using the existing third generation coherence fracture identification method; FIG. 7 illustrates the fracture detection profile obtained using the method of identifying a fracture in the embodiments of the present application. In comparison of FIG. 6 with FIG. 7, it is clear that the fracture detection profile obtained using the fracture identification method in the embodiments of the present application becomes more apparent, and strata responses are rarely found.

Figure 8A:
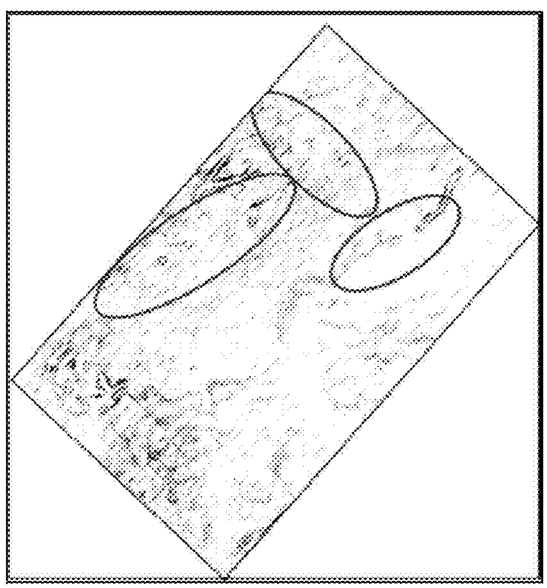
FIG. 8*a* is a schematic diagram illustrating attributes of the faults obtained using the third generation coherence fracture identification method in the prior art in the work area of Mahu-West 1.
Figure 8B:
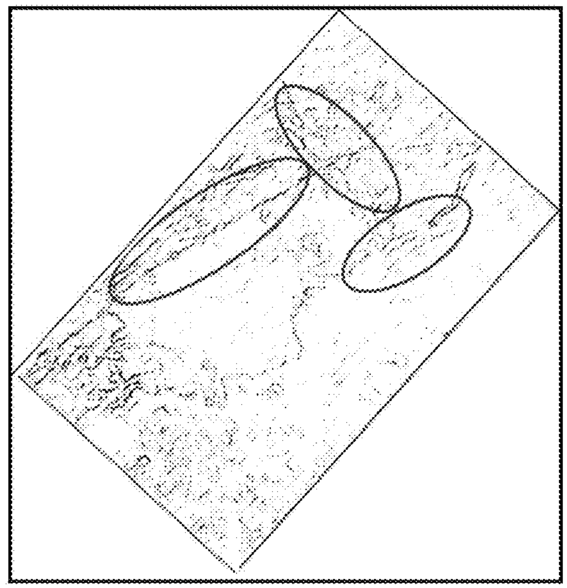
FIG. 8*b* is a schematic diagram illustrating attributes of the faults obtained using the method of identifying a fracture in the embodiments of the present application in the work area of Mahu-West 1.
Figure 9A:
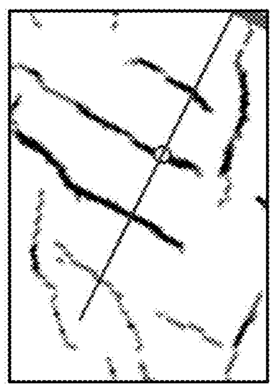
FIG. 9*a* is a schematic diagram illustrating attributes of the faults obtained using the method of identifying a fracture in the embodiments of the present application in Mahu tie-area.
Figure 9B:
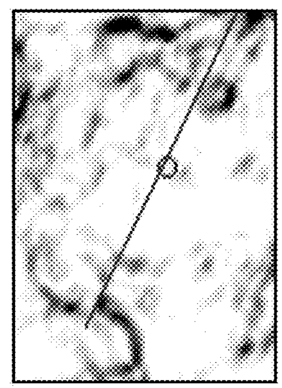
FIG. 9*b* is a schematic diagram illustrating attributes of the faults obtained using the third generation coherence fracture identification method in the prior art in Mahu tie-area.

FIG. 8*a* is a schematic diagram illustrating attributes of the faults obtained using the third generation coherence fracture identification method in the prior art in work area of Mahu-West 1; FIG. 8*b* is a schematic diagram illustrating attributes of the faults obtained using the method of identifying a fracture in embodiments of the present application in work area of Mahu-West 1; it can be seen from the elliptical parts of FIG. 8*a* and FIG. 8*b* in comparison that the fracture detection profile obtained using the fracture identification method in the embodiments of the present application substantially becomes more apparent. Moreover, the minor fracture at dot in FIG. 8*b* is highly visible, while the minor fracture at dot in FIG. 8*a* is nebulous and is difficult to identify. The same case also occurs in Mahu tie-area, as shown in FIG. 9*a* and FIG. 9*b*.

Figure 10A:
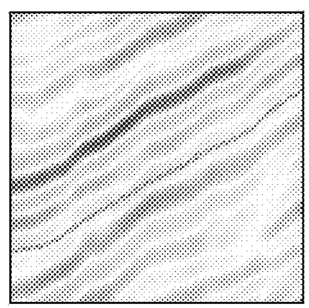
FIG. 10*a* is a schematic diagram illustrating a three-dimensional seismic profile of somewhere in Mahu tie-area in one embodiment of the present application.
Figure 10B:
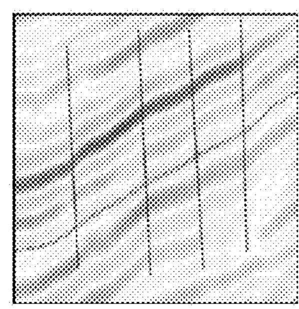
FIG. 10*b* illustrates a manual interpretation result of a three-dimensional fracture of somewhere in Mahu tie-area in one embodiment of the present application.

FIG. 10*a* is a schematic diagram illustrating a three-dimensional seismic profile of somewhere in Mahu tie-area in one embodiment of the present application; FIG. 10*b* illustrates a manual interpretation result of a three-dimensional fracture of somewhere in Mahu tie-area in one embodiment of the present application; it can be seen from FIG. 10*a* and FIG. 10*b* in comparison that the fracture detection profile obtained using the method of identifying a fracture in the embodiments of the present application coincides with the manual interpretation result of the fracture.

Figure 11A:
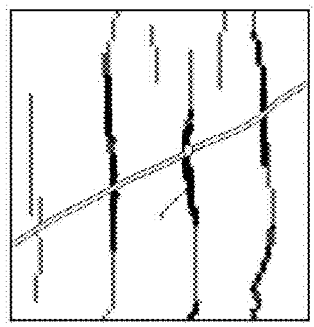
FIG. 11*a* illustrates the fracture detection profile obtained using the method of identifying a fracture in the embodiments of the present application in Mahu tie-area.
Figure 11B:
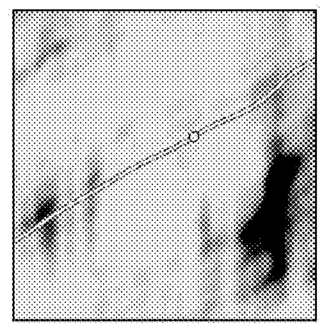
FIG. 11*b* illustrates the fracture detection profile obtained using the third generation coherence fracture identification method in the prior art in Mahu tie-area.

In addition, it can be seen from FIG. 11*a* and FIG. 11*b* in comparison that the method of identifying a fracture in the embodiments of the present application is relatively sensitive to detections of changes in minor fractures slightly dislocated for lineups, and has an obvious response to tiny bending changes in lineups, whereas the fracture detection profile obtained using the existing coherence methods is not only obscured, but also has strata responses.

Figure 12:
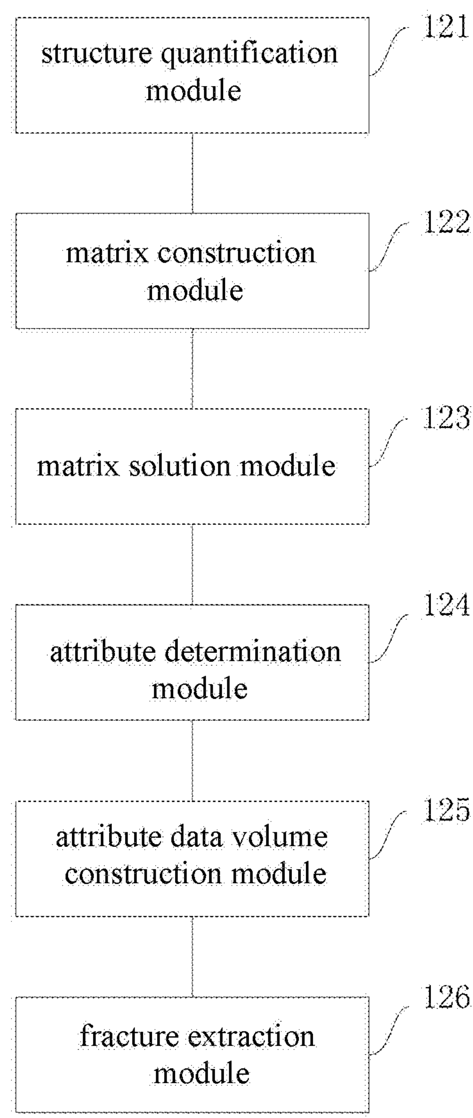
FIG. 12 is a structure block diagram illustrating the device of identifying a fracture in one embodiment of the present application.

As shown in FIG. 12, the device of identifying a fracture in the embodiments of the present application can comprise:

structure quantification module 121 configured to determine three components of structure quantification for each data point in a seismic data volume;

matrix construction module 122 configured to construct a structure quantification matrix of the data point according to the three components of structure quantification for each of the data points;

matrix solution module 123 configured to determine feature value and feature vector of the structure quantification matrix of each of the data points;

attribute determination module 124 configured to determine fracture attribute value of the data point according to the feature value and feature vector of the structure quantification matrix of each of the data points;

attribute data volume construction module 125 configured to construct a data volume of the fracture attribute according to the fracture attribute values of respective data points; and fracture extraction module 126 configured to perform a fracture extraction for the data volume of the fracture attribute according to the feature vectors of the structure quantification matrix of the respective data points.

The device in the embodiments of the present application corresponds to the method in the above embodiments. Therefore, for the details of the device of the present application, reference may be made to the foregoing method in the above embodiments, and detailed description thereof will be omitted herein.

Figure 13:
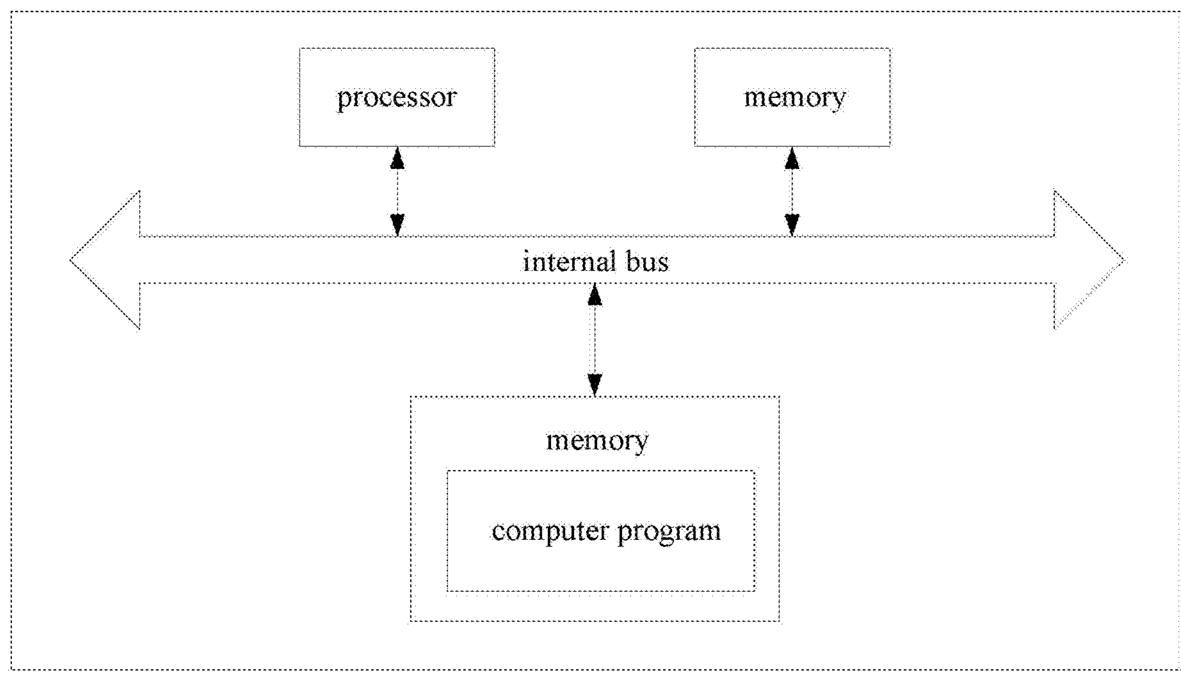
FIG. 13 is a structure block diagram illustrating the device of identifying a fracture in another embodiment of the present application.

As shown in FIG. 13, another device of identifying a fracture in the embodiments of the present application can comprise: a memory, a processor and a computer program stored on the memory, the computer program performs the following steps when being operated by the processor:

determining three components of structure quantification for each data point in a seismic data volume;

constructing a structure quantification matrix of the data point according to the three components of structure quantification for each of the data points;

determining feature value and feature vector of the structure quantification matrix of each of the data points;

determining fracture attribute value of the data point according to the feature value and feature vector of the structure quantification matrix of each of the data points;

constructing a data volume of the fracture attribute according to the fracture attribute values of respective data points; and performing a fracture extraction for the data volume of the fracture attribute according to the feature vectors of the structure quantification matrix of the respective data points.

The device in the embodiments of the present application corresponds to the method in the above embodiments. Therefore, for the details of the device of the present application, reference may be made to the foregoing method in the above embodiments, and detailed description thereof will be omitted herein.

For ease of description, the device divided into various units based on functions is respectively described upon description of the device. Certainly, the function of each unit can be realized in the same one or more software and/or hardware when implementing the present application.

The present invention is described with reference to the flow diagram and/or block diagram of the method, device (system) and computer program product in the embodiments of the present invention. It should be understood that each flow and/or block in the flow diagram and/or block diagram, and a combination of flows and/or blocks in the flow diagram and/or block diagram can be realized by the computer program instructions. These computer program instructions can be provided to a general-purpose computer, a special-purpose computer, an embedded processor or processors of other programmable data processing devices to produce a machine, so that the instructions implemented by computers or processors of other programmable data processing devices are used for realizing the device having the function specified in one or more flows in the flow diagram and/or one or more blocks in the block diagram.

These computer program instructions may also be stored in the computer-readable memory that can guide the computers or other programmable data processing devices to be operated in a specific manner, so that the instructions stored in the computer-readable memory produce a manufacture including an instruction device, which can realize the function specified in one or more flows in the flow diagram and/or one or more blocks in the block diagram.

These computer program instructions can also be loaded into computers or other programmable data processing devices, so that a series of operation steps are performed on the computers or other programmable devices to produce computer-implemented processing, so that the instructions implemented on the computers or other programmable devices are used for realizing the steps of the functions specified in one or more flows in the flow diagram and/or one or more blocks in the block diagram.

In a typical configuration, a computing device comprises: one or more processors (CPU), input/output interfaces, network interfaces and a memory.

The memory may include a volatile memory, a random access memory (RAM) and/or a nonvolatile memory, such as a read-only storage (ROM) or a flash memory (flash RAM) in a computer-readable medium. The memory is an example of the computer-readable medium.

The computer-readable medium includes permanent and non-permanent, removable and non-removable media, which can realize information storage in any method or technique. Information can be computer-readable instructions, data structures, modules of program or other data. An example of the storage media of computer includes, but not limited to a phase change memory (PRAM), a static random access memory (SRAM), a dynamic random access memory (DRAM), other types of random access memory (RAM), a read-only memory (ROM), an electrically-erasable programmable read-only memory (EEPROM), a flash memory or other memory techniques, a compact disk read only memory (CD-ROM), a digital versatile disc (DVD) or other optical storage, magnetic cassette tapes, magnetic diskettes or other magnetic storage apparatus or any other non-transmission medium, which can be used for storing the information accessed by a computing device. According to the definition herein, the computer-readable medium does not include temporary computer readable media (transitory media), such as modulated data signal and carrier wave.

It should be noted that terms “comprising”, “comprise” or any other variant thereof are intended to cover non-exclusive inclusion, so that process, method, commodity or apparatus including a series of elements not only include those elements, but also other elements not explicitly listed, or further include intrinsic elements of such process, method, commodity or apparatus. In the absence of more restrictions, the elements defined by the sentence “including a . . . ” do not exclude that there are other identical elements in the process, method, commodity or apparatus including the elements.

It will be understood by those skilled in the art that the embodiments herein can be provided as a method, a system or a computer program product. Therefore, the present application can adopt forms of the embodiments in terms of hardware alone, software alone or a combination of software and hardware. Moreover, the present application can adopt forms of the computer program product implemented on one or more computer-usable storage media (including but not limited to magnetic disk storage, CD-ROM, optical memory etc.) including computer usable program codes.

The present application can be described in the general context of computer executable instructions, e.g., program modules. In general, program modules include: routine, program, object, component, data structure etc. executing a particular task or realizing a particular abstract data type. The present application can also be put into practice in a distributed computing environment, in these environments, tasks are executed by remote processing devices connected via a communication network. In these environments, the program modules can be located in the local and remote computer-readable storage media including the storage device.

Each embodiment in this Description is described in a progressive manner, and identical/similar parts between embodiments are mutually referred to, the embodiments mainly illustrate differences from other embodiments. In particular, for the embodiment of system, as it is substantially similar to the embodiment of method, the description is fairly simple, referring to the description of the embodiment of method for the relevant part.

The above-described embodiments of the present application are only illustrative, and are not intent to limit the present application. For those skilled in the art, various modifications and variations can be made in the present application. Any modification, equivalent substitution and improvement made within spirit and principle of the application should be included within the scope of claims hereof.

What is claimed is:

1. A method of identifying a fracture of a stratum, comprising:

obtaining a seismic data volume regarding the stratum;

determining three components of structure quantification for each data point in the seismic data volume;

constructing a structure quantification matrix of the data point according to the three components of structure quantification for each of the data points;

determining feature value and feature vector of the structure quantification matrix of each of the data points;

determining fracture attribute value of the data point according to the feature value and feature vector of the structure quantification matrix of each of the data points, the fracture attribute value indicating a degree of the fracture of the stratum;

constructing a data volume of the fracture attribute according to the fracture attribute values of respective data points; and performing a fracture extraction for the data volume of the fracture attribute according to the feature vectors of the structure quantification matrix of the respective data points so as to identify a position of a fracture.

2. The method according to claim 1, wherein the step of determining three components of structure quantification for each data point in the seismic data volume comprising:

convolving each of the data points in the seismic data volume and a first order derivative of Gaussian function to obtain three components of structure quantification for the data point.

3. The method according to claim 2, wherein convolving each of the data points in the seismic data volume and the first order derivative of Gaussian function according to the following equations:

$$d(x)=E(u(x,y,z)\otimes G(x,\sigma)');$$

$$d(y)=E(u(x,y,z)\otimes G(y,\sigma)');$$

$$d(z)=E(u(x,y,z)\lfloor G(z,\sigma)');$$

where d(x), d(y) and d(z) are the three components of structure quantification for the data points, respectively; u(x,z) is a data amplitude of the data points; E( ) is a weighted range control function; and G(x,σ)', G(y,σ)' and G(z,σ)' are the first order derivatives of the Gaussian function in x, y and z directions, respectively.

4. The method according to claim 3, wherein the weighted range control function comprises:

$$\sigma = \alpha \times \frac{1}{f}$$

where σ is a weighted scope control coefficient; α is a constant coefficient; and f is a primary frequency of the data points.

5. The method according to claim 1, wherein constructing the structure quantification matrix of each of the data points according to the following equation:

$$A = \begin{bmatrix} \overline{d(x)\times d(x)} & \overline{d(x)\times d(y)} & \overline{d(x)\times d(z)} \\ \overline{d(y)\times d(x)} & \overline{d(y)\times d(y)} & \overline{d(y)\times d(z)} \\ \overline{d(z)\times d(x)} & \overline{d(z)\times d(y)} & \overline{d(z)\times d(z)} \end{bmatrix}$$

where d(x), d(y) and d(z) are the three components of structure quantification for the data points, respectively; A is the structure quantification matrix of the data points; and each element in the A is a weighted mean of the three components of structure quantification for the data points.

6. The method according to claim 1, wherein determining fracture attribute value of each of the data points according to the following equation:

$$c = \left(1 - \frac{\lambda_1 - \lambda_2}{\lambda_1 + \lambda_2}\right) \times \left(\frac{\lambda_2 - \lambda_3}{\lambda_2 + \lambda_3}\right) \times \left(\left(\frac{\partial \overset{r}{l_1}}{\partial x}\right)^2 + \left(\frac{\partial \overset{r}{l_1}}{\partial y}\right)^2 + \left(\frac{\partial \overset{r}{l_1}}{\partial z}\right)^2\right)$$

where C is a fracture attribute value of the data point, $\lambda_1$, $\lambda_2$ and $\lambda_3$ are three feature vectors of the data points, and $\overset{u}{l_1}$ is a feature vector corresponding to the maximum feature value.

7. The method according to claim 1, wherein the fracture attribute values range from 0 to 1 in the data volume of the fracture attribute, in the stratum corresponding to the seismic data volume, a attribute value of the fracture attribute value is 0 in a level site and a attribute value of the fracture attribute value is 1 in a distorted or bad break.

8. The method according to claim 7, wherein the step of performing the fracture extraction for the data volume of the fracture attribute according to the feature vectors of the structure quantification matrix of the respective data points comprising:

determining feature vector corresponding to the maximum feature value of the structure quantification matrix for each of the data points; and extracting the maximum fracture attribute value along the feature vector direction from the data volume of the fracture attribute, and assigning 0 to the fracture attribute value of the non-maximum value part in the feature vector direction in the data volume of the fracture attribute.

9. A device of identifying a fracture of a stratum, comprising:

seismic data volume obtaining module configured to obtain a seismic data volume regarding the stratum;

structure quantification module configured to determine three components of structure quantification for each data point in the seismic data volume;

matrix construction module configured to construct a structure quantification matrix of the data point according to the three components of structure quantification for each of the data points;

matrix solution module configured to determine feature value and feature vector of the structure quantification matrix of each of the data points;

attribute determination module configured to determine fracture attribute value of the data point according to the feature value and feature vector of the structure quantification matrix of each of the data points, the fracture attribute value indicating a degree of the fracture of the stratum;

attribute data volume construction module configured to construct a data volume of the fracture attribute according to the fracture attribute values of respective data points; and fracture extraction module configured to perform a fracture extraction for the data volume of the fracture attribute according to the feature vectors of the structure quantification matrix of the respective data points so as to identify a position of a fracture.

10. The device according to claim 9, wherein the structure quantification module is further configured to convolve each of the data points in the seismic data volume and a first order derivative of Gaussian function to obtain three components of structure quantification for the data point.

11. The device according to claim 10, wherein convolving each of the data points in the seismic data volume and the first order derivative of Gaussian function according to the following equations:

$$d(x)=E(u(x,y,z)\otimes G(x,\sigma)');$$

$$d(y)=E(u(x,y,z)\otimes G(y,\sigma)');$$

$$d(z)=E(u(x,y,z)\otimes G(z,\sigma)');$$

where d(x), d(y), and d(z) are the three components of structure quantification for the data points, respectively; u(x,y,z) is a data amplitude of the data points; E( ) is a weighted range control function; $G(x,\sigma)'$, $G(y,\sigma)'$ and $G(z,\sigma)'$ are the first order derivatives of the Gaussian function in x, y and z directions, respectively.

12. The device according to claim 11, wherein the weighted range control function comprises:

$$\sigma=\alpha\times\frac{1}{f}$$

where $\sigma$ is a weighted scope control coefficient; $\alpha$ is a constant coefficient; and f is a primary frequency of the data points.

13. The device according to claim 9, wherein constructing the structure quantification matrix of each of the data points according to the following equation:

$$A=\begin{bmatrix}\overline{d(x)\times d(x)} & \overline{d(x)\times d(y)} & \overline{d(x)\times d(z)}\\ \overline{d(y)\times d(x)} & \overline{d(y)\times d(y)} & \overline{d(y)\times d(z)}\\ \overline{d(z)\times d(x)} & \overline{d(z)\times d(y)} & \overline{d(z)\times d(z)}\end{bmatrix}$$

where d(x), d(y) and d(z) are the three components of structure quantification for the data points, respectively; A is the structure quantification matrix of the data points; and each element in the A is a weighted mean of the three components of the structure quantification of the data points.

14. The device according to claim 9, wherein determining fracture attribute value of each of the data points according to the following equation:

$$c=\left(1-\frac{\lambda_1-\lambda_2}{\lambda_1+\lambda_2}\right)\times\left(\frac{\lambda_2-\lambda_3}{\lambda_2+\lambda_3}\right)\times\left(\left(\frac{\partial \overset{r}{l_1}}{\partial x}\right)^2+\left(\frac{\partial \overset{r}{l_1}}{\partial y}\right)^2+\left(\frac{\partial \overset{r}{l_1}}{\partial z}\right)^2\right)$$

where C is a fracture attribute value of the data points, $\lambda_1$, $\lambda_2$ and $\lambda_3$ are three feature vectors of the data points, and $\overset{u}{l_1}$ his a feature vector corresponding to the maximum feature value.

15. The device according to claim 9, wherein the fracture attribute values range from 0 to 1 in the data volume of the fracture attribute, in the stratum corresponding to the seismic data volume, a attribute value of the fracture attribute value is 0 in a level site and a attribute value of the fracture attribute value is 1 in a distorted or bad break.

16. The device according to claim 15, wherein the fracture extraction module is further configured to:

determine feature vector corresponding to the maximum feature value of the structure quantification matrix for each of the data points; and extract the maximum fracture attribute value along the feature vector direction from the data volume of the fracture attribute, and assigning 0 to the fracture attribute value of the non-maximum value part in the feature vector direction in the data volume of the fracture attribute.

17. A device of identifying a fracture of a stratum, comprising: a memory, a processor and a computer program stored on the memory, wherein the computer program performs the following steps when being operated by the processor:

obtaining a seismic data volume regarding the stratum;

determining three components of structure quantification for each data point in the seismic data volume;

constructing a structure quantification matrix of the data point according to the three components of structure quantification for each of the data points;

determining feature value and feature vector of the structure quantification matrix of each of the data points;

determining fracture attribute value of the data point according to the feature value and feature vector of the structure quantification matrix of each of the data points, the fracture attribute value indicating a degree of the fracture of the stratum;

constructing a data volume of the fracture attribute according to the fracture attribute values of respective data points; and performing a fracture extraction for the data volume of the fracture attribute according to the feature vectors of the structure quantification matrix of the respective data points so as to identify a position of a fracture.

* * * * *

UNITED STATES PATENT AND TRADEMARK OFFICE

CERTIFICATE OF CORRECTION

PATENT NO. : 10,845,495 B2
APPLICATION NO. : 15/878254
DATED : November 24, 2020
INVENTOR(S) : Chao Feng et al.

It is certified that error appears in the above-identified patent and that said Letters Patent is hereby corrected as shown below:

In the Claims

On Line 4 of Column 16, delete "$\lfloor$" before "G" and insert --$\otimes$--; and On Line 7 of Column 16, delete "u(x,z)" and insert --u(x,y,z)--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*